United States Patent
Sato et al.

(10) Patent No.: US 7,085,559 B2
(45) Date of Patent: Aug. 1, 2006

(54) MOBILE COMMUNICATION SYSTEM, RADIO CONTROLLER, BASE STATION AND TRANSMISSION POWER CONTROLLING METHOD

(75) Inventors: Takuya Sato, Yokohama (JP); Minami Ishii, Yokohama (JP); Masafumi Usuda, Yokosuka (JP); Takehiro Nakamura, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 131 days.

(21) Appl. No.: 10/787,126

(22) Filed: Feb. 27, 2004

(65) Prior Publication Data
US 2004/0229603 A1 Nov. 18, 2004

(30) Foreign Application Priority Data
Feb. 28, 2003 (JP) .............................. 2003-054230

(51) Int. Cl.
*H04Q 7/20* (2006.01)
*H04B 7/00* (2006.01)
(52) U.S. Cl. .................. 455/422.1; 455/525; 455/561; 455/560
(58) Field of Classification Search ............. 455/422.1, 455/525, 561, 560
See application file for complete search history.

(56) References Cited

U.S. PATENT DOCUMENTS

| 6,085,108 A * | 7/2000 | Knutsson et al. ........... 455/522 |
| 6,259,927 B1 * | 7/2001 | Butovitsch et al. ......... 455/522 |
| 6,553,016 B1 * | 4/2003 | Roxbergh .................... 370/331 |
| 6,577,880 B1 * | 6/2003 | Ishida et al. ............. 455/562.1 |
| 6,678,531 B1 * | 1/2004 | Salonaho .................... 455/522 |
| 6,708,041 B1 * | 3/2004 | Butovitsch et al. ......... 455/522 |

FOREIGN PATENT DOCUMENTS

| EP | 1 276 233 A2 | 1/2003 |
| JP | 11-340910 | 12/1999 |
| JP | 2002-232353 | 8/2002 |

* cited by examiner

*Primary Examiner*—Joseph Feild
*Assistant Examiner*—S. Smith
(74) *Attorney, Agent, or Firm*—Oblon, Spivak, McClelland, Maier & Neustadt, P.C.

(57) ABSTRACT

A mobile communication system having plural base stations and a radio controller configured to control each of the base stations is disclosed. Each of the base stations has a transmission power notifying unit which notifies the radio controller of downlink transmission power to mobile stations. The radio controller includes a cell determination unit which determines one cell having good communications quality among cells provided by each of the base stations; a reference power ratio decision unit which decides a reference power ratio based on the ratio of the downlink transmission power to the maximum transmission power of the base station providing the determined cell; and a reference power ratio notifying unit which notifies each of the base stations of the decided reference power ratio. Each of the base stations additionally has a transmission power controller which controls the downlink transmission power so that the ratio of the downlink transmission power to its maximum transmission power to mobile stations approaches the reference power ratio.

9 Claims, 7 Drawing Sheets

MOBILE COMMUNICATION SYSTEM, RADIO CONTROLLER, BASE STATION AND TRANSMISSION POWER CONTROLLING METHOD

BACKGROUND OF THE INVENTION

The present invention generally relates to base stations, a radio controller for controlling the base stations and a mobile communication system including them, and, more particularly, to a mobile communication system which can control downlink transmission power from base stations to mobile stations.

In a mobile communication system such as the CDMA (Code Division Multiple Access) system in which so called soft handoff is available, mobile stations can simultaneously communicate with nearby plural base stations in a soft handoff.

Generally, in mobile communication systems, radio links established between base stations and mobile stations are always varying due to fading. In order to suppress such fading effect, a mobile station in a soft handoff sends an instruction (such as a downlink transmission power control instruction, for example, a TPC bit) to plural base stations communicating with the mobile station itself to request the base stations to control their downlink (base station to mobile station) transmission powers. The base station, in response to the downlink transmission power control instruction, increases or decreases its downlink transmission power and performs power balance control for the purpose of balancing the downlink transmission power.

On the other hand, a base station sends an uplink (mobile station to base station) transmission power control instruction to mobile stations communicating with the base station itself. The mobile station, in response to the uplink transmission power instruction, increases or decreases its uplink transmission power.

In closed loop control for transmission power control, a mobile station in a soft handoff transmits downlink power control instructions with the same transmission power to plural base stations which establish links between the plurality of base stations and the mobile station.

Therefore, if the transmission loss of the uplink from the mobile station to a base station is small, the base station can correctly receive the downlink power control instruction. However, if the transmission loss of the uplink is large, the base station may fail to receive the downlink power control instruction. As a result, the transmission power values of the downlinks established between the plural base stations and the mobile station may become uneven.

Consideration is given to problems that might occur when the transmission power values of the downlinks established between the plural base stations and the mobile station become uneven. For example, assume that a base station fails to receive a downlink power control instruction from a mobile station due to a large uplink transmission loss, and then the downlink power of the non-receiving base station becomes lower than the downlink power of another base station experiencing a small uplink transmission loss. In this case, mobile stations tend to fail to receive an uplink power control instruction from a base station experiencing a large uplink transmission loss. However, because uplink transmission power values are mainly controlled by an uplink power control instruction from a base station experiencing a small transmission loss, the problem is not so serious.

On the other hand, assume that a base station fails to receive a downlink power control instruction from a mobile station due to a large uplink transmission loss, and then the downlink power of the non-receiving base station becomes higher than the downlink power of another base station experiencing a small uplink transmission loss. In this case, the downlink power of the non-receiving base station may become larger than necessary, resulting in interference to other mobile stations within the cell being serviced by the non-receiving base station and therefore low downlink capacity.

In order to solve such a problem, Japanese Patent Laid-Open Publication No. 11-340910 discloses a technique, in which whenever a base station receives a downlink power control instruction, the base station changes its downlink power responding to the power control instruction and controls the downlink transmission power value so as to approach a predetermined value. In the '910 Publication, the maximum transmission power, the minimum transmission power, the mean value between the decibel values of the maximum and minimum transmission powers in the base station, and the statistical value of the base station transmission power are utilized as a reference value.

Japanese Patent Laid-Open Publication No. 2002-232353 discloses another technique, in which base stations are separated into two groups, one group having high downlink communications quality and another group having low downlink communications quality. Power balance control is continued fort the high quality group. Downlink transmission power values of base stations belonging to the low quality group are decreased to a predetermined level, in order to lower the interference against the high quality downlinks and increase the downlink capacity.

However, the '910 Publication does not consider a situation where downlink communications quality of each base station is different from the others. Therefore, for example, if a base station increases its downlink transmission power value due to a degraded downlink communications quality level, then once the increased downlink transmission power value is determined as a reference value, other base stations' downlink power values become higher than necessary, resulting in wastefulness.

The '353 Publication does not consider how to determine a reference value for transmission power values in power balance control.

SUMMARY OF THE INVENTION

A general object of the present invention is to provide a radio controller, base stations, mobile communication system and transmission power control method which can determine a reference for downlink transmission power values in power balance control.

The above object of the present invention is achieved by a mobile communication system having a plurality of base stations and a radio controller configured to control each of the base stations, wherein, each of the base stations comprises a transmission power notifying unit which notifies the radio controller of downlink transmission power values to mobile stations;

the radio controller comprises:

a cell determination unit which determines one cell having good communications quality among cells provided by each of the base stations;

a reference power ratio decision unit which decides a reference power ratio based on the ratio of downlink transmission power to the maximum transmission power of the base station providing the determined cell; and a reference power ratio notifying unit which notifies each of the base stations of the decided reference power ratio; and each of the base station further comprises a transmission power controller which controls downlink transmission power so that the ratio of the downlink transmission power to its maximum transmission power to mobile stations approaches the reference power ratio.

The above object of the present invention is also achieved by a radio controller for controlling a plurality of base stations in a radio communication system, comprising:

a transmission power acquiring unit which acquires downlink transmission power values from the base stations to mobile stations, which are provided by the base stations;

a cell determination unit which determines one cell having good communications quality among cells provided by each of the base stations;

a reference power ratio decision unit which decides a reference power ratio based on the ratio of downlink transmission power to the maximum transmission power of the base station providing the determined cell; and a reference power ratio notifying unit which notifies each of the base stations of the decided reference power ratio.

The above object of the present invention is also achieved by a base station establishing a radio communication system together with other base stations and a radio controller which controls each of the base stations, comprising:

a transmission power notifying unit which notifies the radio controller of downlink transmission power values to mobile stations;

a reference power ratio acquiring unit which acquires a reference power ratio provided by the radio controller, the reference power ratio being decided based on the ratio of downlink transmission power to the maximum transmission power of a base station providing a cell having a good communications quality level; and a transmission power controller which controls downlink transmission power so that the ratio of the downlink transmission power to its maximum transmission power to mobile stations approaches the reference power ratio.

The above object of the present invention is also achieved by a transmission power controlling method in a mobile communication system having a plurality of base stations and a radio controller configured to control each of the base stations, comprising:

a step of notifying, by each of the base stations, the radio controller of downlink transmission power values to mobile stations;

a step of determining, by the radio controller, one cell having a good communication quality level among cells provided by each of the base stations;

a step of deciding, by the radio controller, a reference power ratio based on the ratio of downlink transmission power to the maximum transmission power of the base station providing the determined cell;

a step of notifying, by the radio controller, each of the base stations of the decided reference power ratio; and a step of controlling, by each of the base stations, downlink transmission power so that the ratio of the downlink transmission power to its maximum transmission power to mobile stations approaches the reference power ratio.

The above and other objects and features of the present invention will become more apparent from the following description taken in conjunction with the accompanying drawings.

DESCRIPTION OF THE PREFERRED EMBODIMENTS

The following is a description of embodiments of the present invention, with reference to the accompanying drawings.

Figure 1:
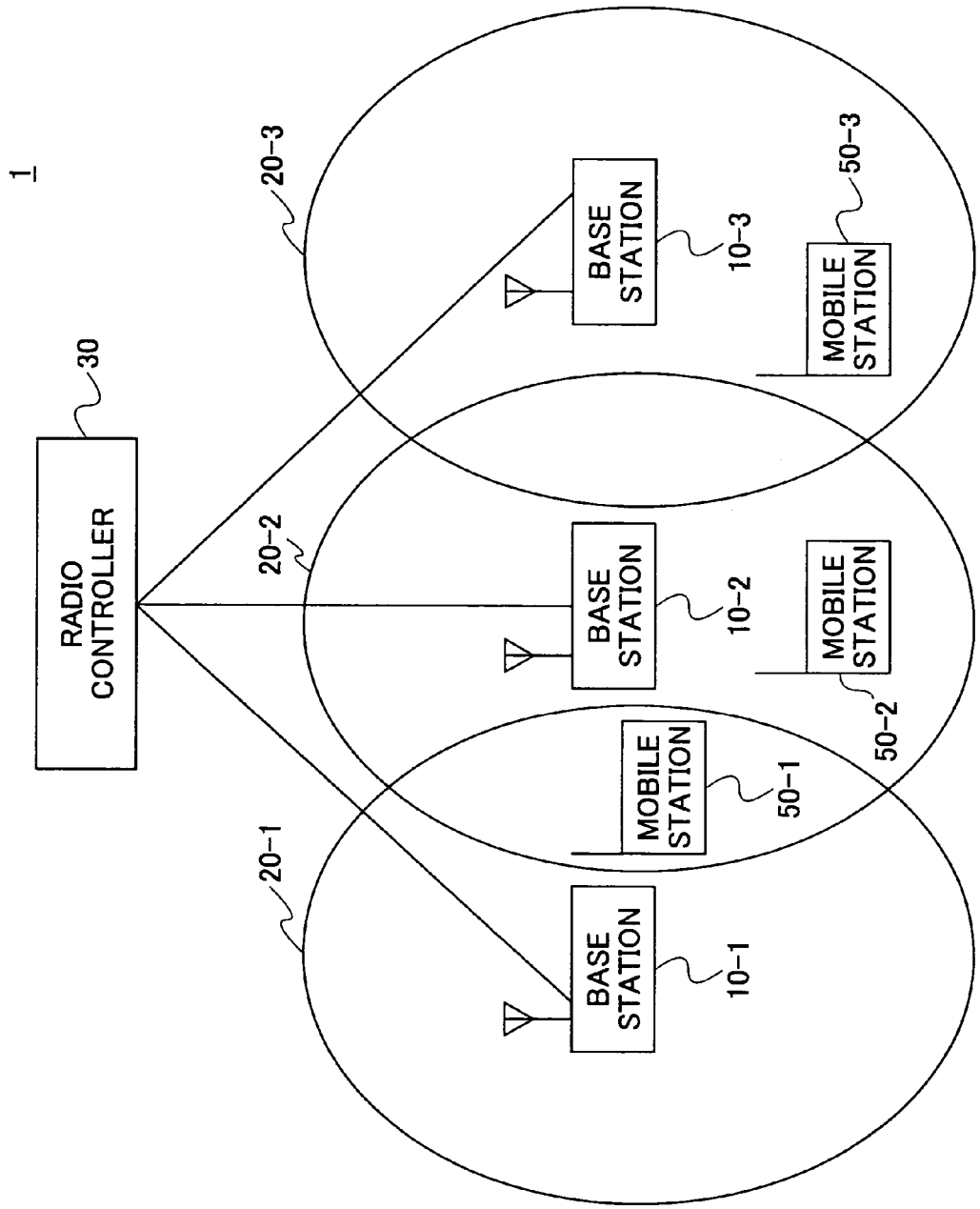
FIG. 1 schematically illustrates the entire structure of a mobile communication system in accordance with embodiments of the present invention.

FIG. 1 schematically illustrates the entire structure of a mobile communication system according to embodiments of the present invention. The mobile communication system 1 shown in FIG. 1 employs the CDMA system, in which so called soft handoff is available, that is, a mobile station simultaneously communicates with nearby plural base stations during a handoff. The mobile communication system 1 comprises base stations 10-1, 10-2 and 10-3 (hereinafter collectively referred to as "the base stations 10"), a radio controller 30 controlling the base stations 10, and mobile stations 50-1, 50-2 and 50-3 (hereinafter collectively referred to as "the mobile stations 50").

In FIG. 1, the base stations 10-1, 10-2 and 10-3 provide cells 20-1, 20-2 and 20-3 (hereinafter collectively referred to as "the cells 20") as radio zones, respectively. The mobile station 50-1 located in a boundary area between the cell 20-1 and the cell 20-2 is in a soft handoff, and is communicating with both the base station 10-1 and the base station 10-2.

In this mobile communication system 1, power balance control is performed, in which the downlink transmission power from each of the base stations 10 to, a mobile station in a soft handoff is controlled based on a predetermined reference power ratio. A first embodiment and a second embodiment of the power balance control in the mobile communication system 1 are explained below in detail.

First Embodiment

In the first embodiment, uplink communications quality is utilized for controlling the power balance in the mobile communication system 1.

Figure 2:
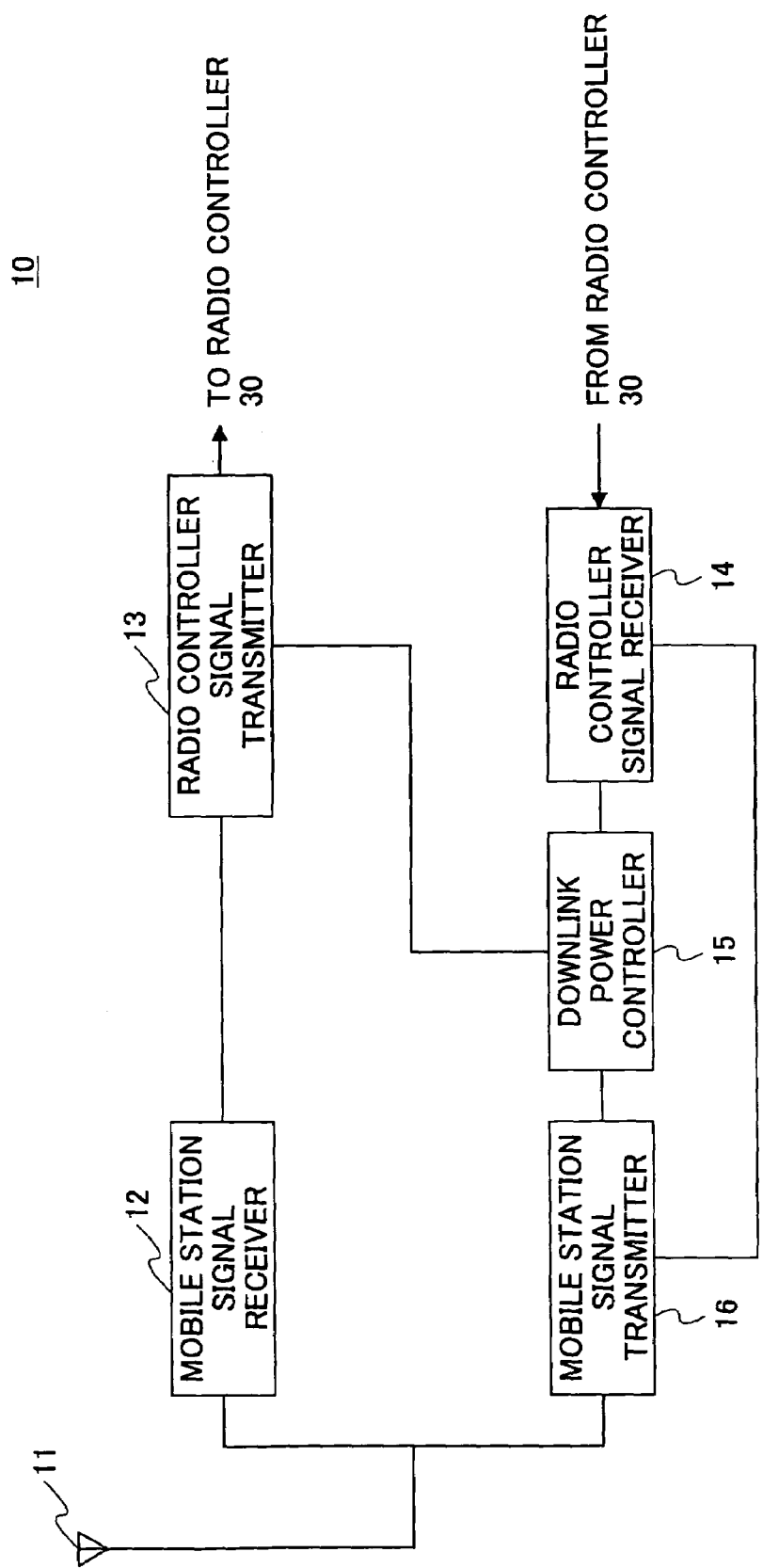
FIG. 2 is a block diagram of a base station in accordance with a first and second embodiment of the present invention.

FIG. 2 is a block diagram of a base station 10 according to the first embodiment of the present invention. The base station 10 shown in FIG. 2 comprises an antenna 11, a mobile station signal receiver 12, radio controller signal transmitter 13, a radio controller signal receiver 14, a downlink power controller 15 and a mobile station signal transmitter 16.

Figure 3:
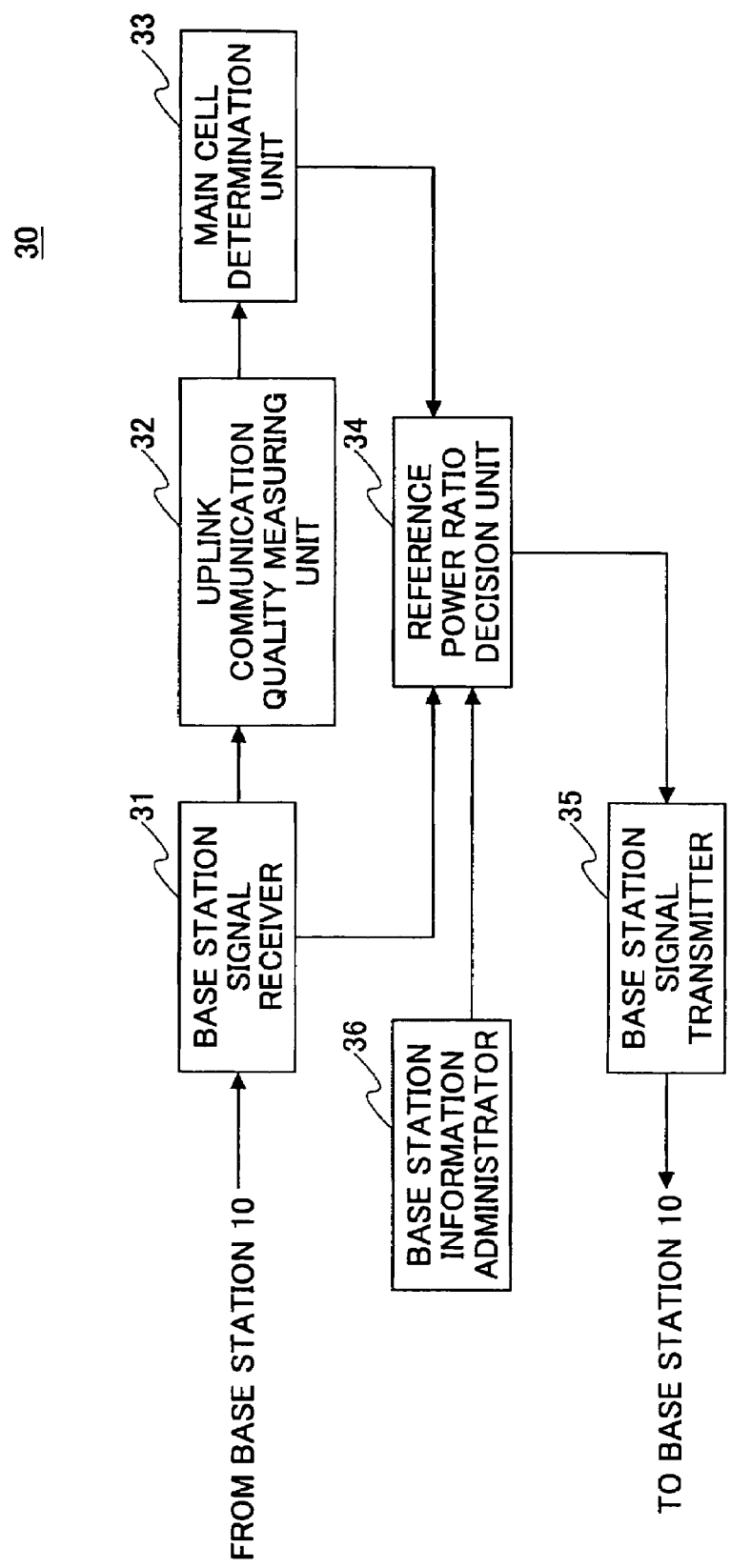
FIG. 3 is a block diagram of a radio controller in accordance with the first embodiment.

FIG. 3 illustrates a block diagram of a radio controller according to the first embodiment of the present invention.

The radio controller 30 shown in FIG. 3 comprises a base station signal receiver 31, an uplink communication quality measuring unit 32, a main cell determination unit 33, a reference power ratio decision unit 34, a base station signal transmitter 35 and a base station information administrator 36.

With reference to FIG. 2, the mobile station signal receiver 12 in the base station 10 communicating with a mobile station 50 in a soft handoff, receives a user signal from the mobile station 50 via the antenna 11. The mobile station signal receiver 12 outputs the received user signal to the radio controller signal transmitter 13.

The radio controller signal transmitter 13 adds identification information (cell ID information) for cell 20 provided by the base station 10 itself, into the inputted user signal, and transmits the user signal and the cell ID information to the radio controller 30. The radio controller signal transmitter 13 acquires a downlink transmission power value established at that time by the downlink power controller 15, and transmits the power value together with the cell ID information to the radio controller 30.

Next, with reference to FIG. 3, the base station signal receiver 31 receives a user signal and a downlink transmission power value from each of the base stations 10 communicating with a mobile station 50 in a soft handoff. The base station signal receiver 31 further outputs the received user signals to the uplink communication quality measuring unit 32 and a switching equipment (not shown), and outputs the received downlink transmission power values to the reference power ratio decision unit 34.

The uplink communication quality measuring unit 32, based on each of the inputted user signals, measures the uplink communications quality from the mobile station 50 in a soft handoff to each base station 10. The measured uplink communications quality may be any parameter, for example a block error rate, a reception SNIR or a reception level in a common pilot channel. The uplink communication quality measuring unit 32 transmits each of the measured uplink communications qualities and the cell ID information included in the user signal corresponding to the uplink communications qualities, to the main cell determination unit 33.

The main cell determination unit 33 determines a cell 20 having the best uplink communications quality as the main cell, among the cells 20 provided by each base station 10 communicating with a mobile station 50 in a soft handoff. More concretely, the main cell determination unit 33 identifies the best uplink communications quality among plural uplink communications qualities received from the uplink communication quality measuring unit 32. Next, the main cell determination unit 33 determines the cell 20 provided by the base station 10 corresponding to the best uplink communications quality, as the main cell. The mail cell determination unit 33 outputs the cell ID information corresponding to the best uplink communications quality (the cell ID information of the main cell) to the reference power ratio decision unit 34.

The base station information administrator 36 correlates a maximum downlink transmission power value with the cell ID information of each of the base stations 10, and administers them.

The reference power ratio decision unit 34 receives each of the downlink transmission power values from the base station signal receiver 31, and calculates a ratio of the downlink transmission power value to the maximum downlink transmission power value of the base station 10 providing the main cell. Then the reference power ratio decision unit 34 decides the calculated ratio to be a reference power ratio.

More concretely, the reference power ratio decision unit 34 extracts the cell ID information out of each downlink transmission power value from the base station signal receiver 31. Next, out of the extracted cell ID information, the reference power ratio decision unit 34 identifies cell ID information matching the cell ID information from the main cell determination unit 33. The reference power ratio decision unit 34 identifies a downlink transmission power value that includes the identified cell ID information. Out of the maximum downlink transmission power values administered by the base station information administrator 36, the reference power ratio decision unit 34 identifies a maximum downlink transmission power value corresponding to the cell ID information from the main cell determination unit 33. The reference power ratio decision unit 34 calculates a ratio of the identified downlink transmission power value to the identified maximum downlink transmission, and determines the calculated ratio as a reference power ratio. The determined power ratio is outputted to the base station signal transmitter 35.

The base station signal transmitter 35 transmits the reference power ratio from the reference power ratio decision unit 34 to each base station 10 communicating with the mobile station 50 in a soft handoff. And if there is a user signal to be sent to the mobile station 50 in the soft handoff, the base station signal transmitter transmits the user signal to each base station 10 communicating with the mobile station 50.

With reference to FIG. 2 again, the radio controller signal receiver 14 in the base station 10 communicating with the mobile station 50 in the soft handoff receives the reference power ratio from the radio controller 30, and sends it to the downlink power controller 15. The radio controller signal receiver 14 receives the user signal if any and sends it to the mobile station signal transmitter 16.

The downlink power controller 15 calculates a reference value for a downlink transmission power value to be used by its own base station 10, based on the received reference power ratio and its own downlink maximum transmission power value. For example, if the reference power ratio is obtained by dividing the downlink transmission power value by the downlink maximum transmission of the base station that provides the main cell, the downlink power controller 15 obtains a reference value for its downlink transmission power value by multiplying the reference power ratio by its own downlink maximum transmission power value. Then, the downlink power controller 15 controls its own downlink transmission power so that it approaches the reference value. In this manner, the downlink power controller 15 controls its own downlink transmission power value so that the ratio of its own downlink transmission power value to the downlink maximum transmission power value approaches the reference power ratio.

The mobile station signal transmitter 16 transmits the user signal and other signals to the communicating mobile station 50 in the soft handoff, by using the downlink transmission power value determined by the downlink power controller 15.

Figure 4:
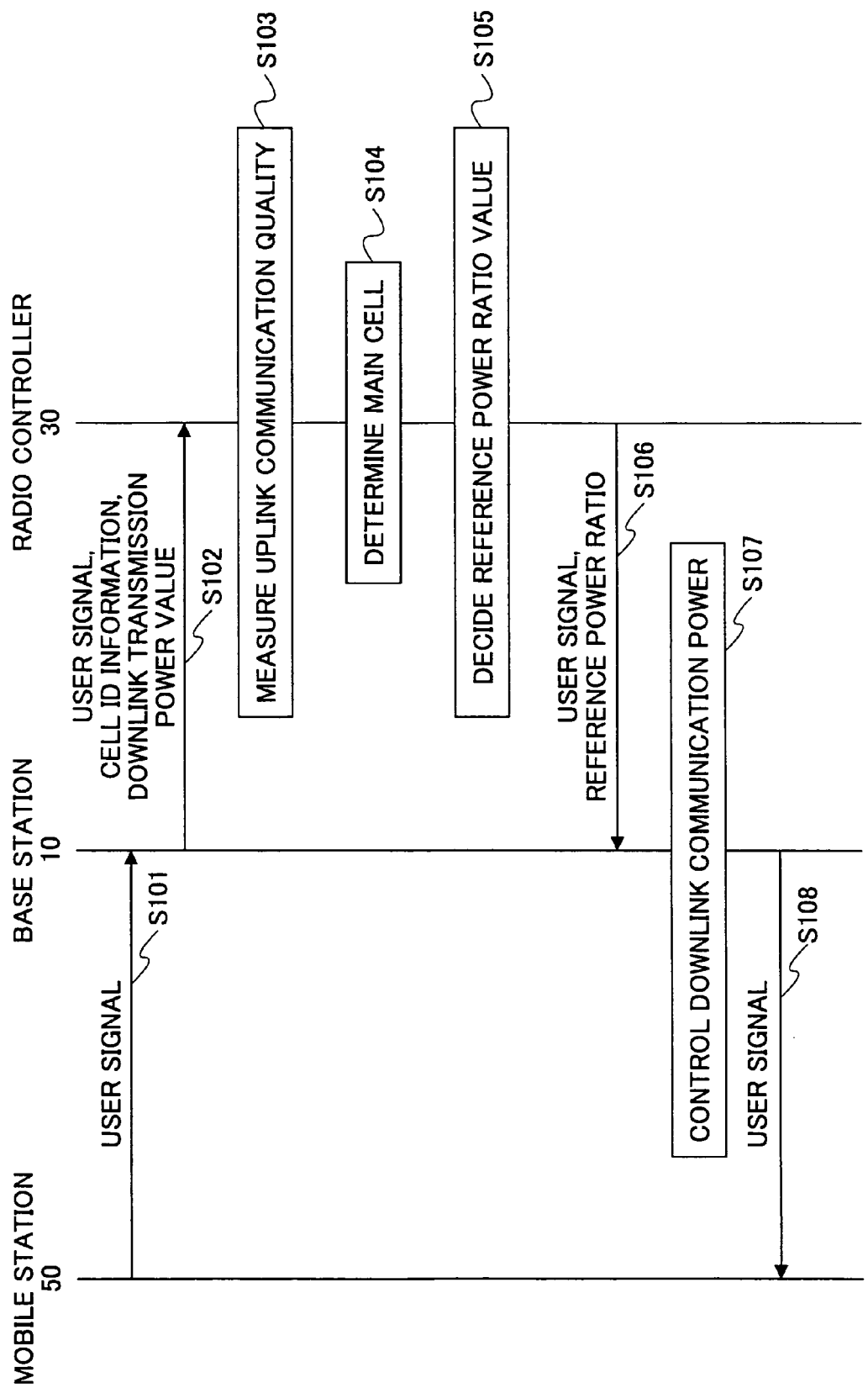
FIG. 4 is a sequence chart showing an operation of the mobile communication system according to the first embodiment.

Next, the operation of the mobile communication system 1 according to the first embodiment of the present invention is explained below. FIG. 4 illustrates the operational sequence of the mobile communication system 1 according to the first embodiment of the present invention. The base station 10 communicating with the mobile station 50 in a soft handoff receives a user signal from the mobile station 50 (Step 101). The base station 10 transmits the user signal, cell ID information for the cell provided by itself and its own downlink transmission power value at that time to the radio controller 30 (Step 102).

The radio controller 30 measures each uplink communications quality based on the user signal received from each base station 10 (Step 103). Out of the cells 20 provided by each base station 10 communicating with the mobile station 50 in the soft handoff, the radio controller 30 identifies a cell 20 having the best uplink communications quality, and determines the best cell 20 as the main cell (Step 104).

Next, the radio controller 30 calculates the ratio of the downlink transmission power value to the downlink maximum power value in the base station providing the main cell, and decides the calculated ratio to be the reference power ratio (Step 105). Then the radio controller 30 transmits the decided reference power ratio and user signals to each base station 10 communicating with the mobile station 50 in the soft handoff (Step 106).

Each of the base stations 10 communicating with mobile station 50 in the soft handoff controls its own downlink transmission power value so that the ratio of its own downlink transmission power value to its own downlink maximum transmission power value approaches the received reference power ratio (Step 107). The base station 10 transmits the user signal and other signals to the communicating mobile station 50 by the controlled downlink transmission power value (Step 108).

In the first embodiment, the uplink communication quality measuring unit 32 measures uplink communications qualities, but each base station may measure its own uplink communications quality. In this case, each base station 10 has an uplink communication measuring unit between the mobile station signal receiver 12 and the radio controller signal transmitter 13, instead of the uplink communication quality measuring unit 32 in the radio controller 30. The radio controller signal transmitter 13 in the base station 10 transmits an uplink communications quality measured by the uplink communication quality measuring unit, to the radio controller 30. The base station signal receiver 31 in the radio controller 30 receives the uplink communications qualities from the base stations 10, and sends them to the main cell determination unit 33. The main cell determination unit 33 determines the main cell based on the uplink communications qualities.

Second Embodiment

In a second embodiment, downlink communications qualities are utilized for controlling the power balance in the mobile communication system 1.

The structure of each base station 10 in the second embodiment is the same as that in the first embodiment shown in FIG. 2. That is, the base station 10 comprises an antenna 11, a mobile station signal receiver 12, radio controller signal transmitter 13, a radio controller signal receiver 14, a downlink power controller 15 and a mobile station signal transmitter 16. FIG. 2 is referred to again when explaining the base station according to the second embodiment.

On the other hand, the structure of a radio controller 30 according to the second embodiment is different from that in the first embodiment shown in FIG. 3.

Figure 5:
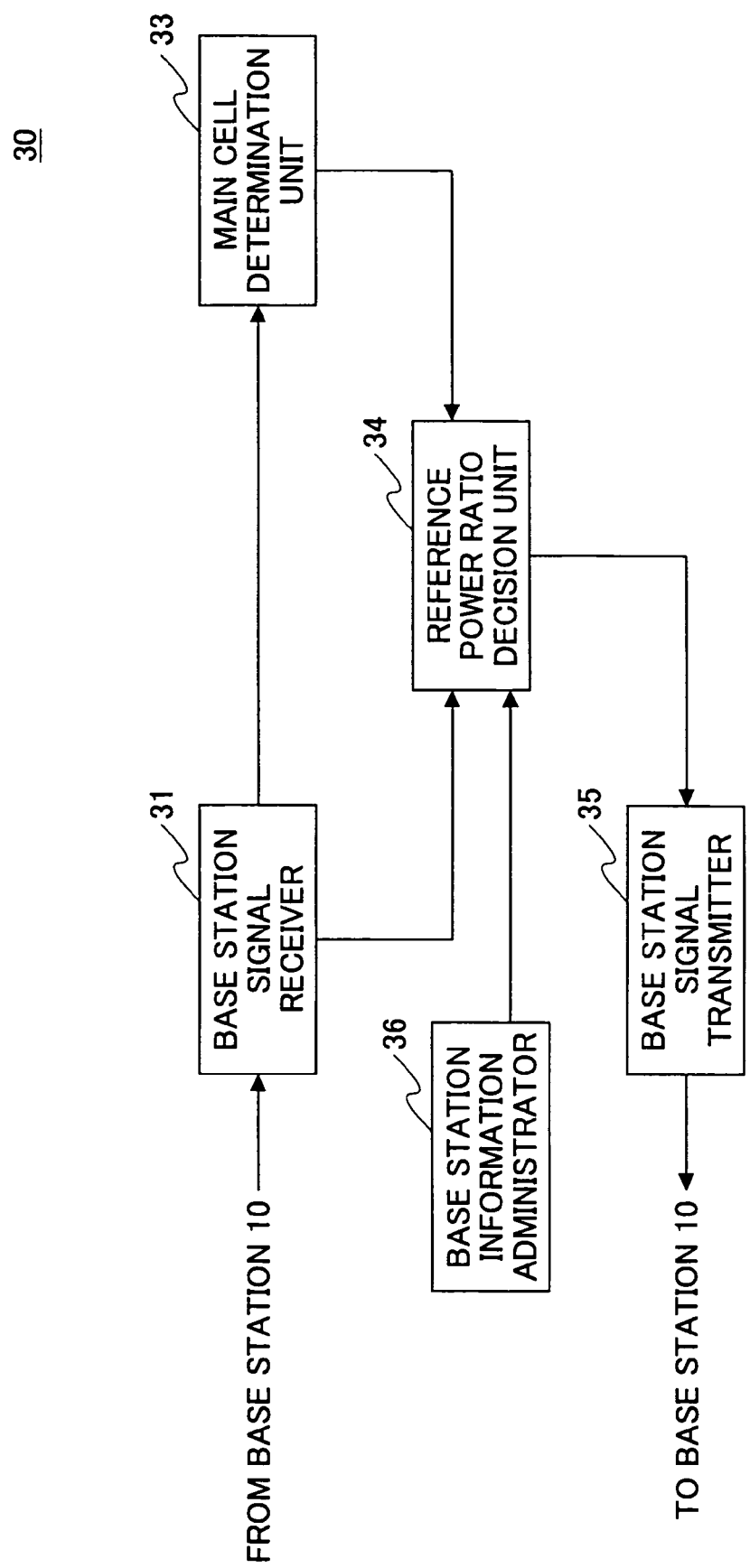
FIG. 5 is a block diagram of a radio controller in accordance with the second embodiment.

FIG. 5 is a block diagram of a radio controller according to the second embodiment of the present invention. The radio controller 30 shown in FIG. 5 comprises a base station signal receiver 31, a main cell determination unit 33, a reference power ratio decision unit 34, a base station signal transmitter and a base station information administrator 36.

With reference to FIG. 2, the mobile station signal receiver 12 in the base station 10 communicating with a mobile station 50 in a soft handoff receives a user signal from the mobile station 50 via the antenna 11, similar to the first embodiment. The mobile station signal receiver 12 receives a downlink communications quality level measured by the mobile station 10 in the soft handoff. The mobile station receiver 12 sends the received user signal and the downlink communications quality level to the radio controller signal transmitter 13.

The radio controller signal transmitter 13 transmits the inputted user signal to the radio controller 30. The radio controller signal transmitter 13 adds identification information (cell ID information) for a cell 20 provided by the base station 10 itself, to the inputted user signal, and transmits the user signal and the cell ID information to the radio controller 30. The radio controller signal transmitter 13 acquires a downlink transmission power value established at that time by the downlink power controller 15, and transmits the power value together with the cell ID information to the radio controller 30.

Next, with reference to FIG. 5, the base station signal receiver 31 receives a user signal, a downlink communications quality level and a downlink transmission power value from each of the base stations 10 communicating with a mobile station 50 in a soft handoff. The base station signal receiver 31 further outputs the received user signals to a switching equipment (not shown), outputs the received downlink communications quality levels to the main cell determination unit 33, and outputs the received downlink transmission power values to the reference power ratio decision unit 34.

The main cell determination unit 33 determines a cell 20 having the best downlink communications quality as the main cell, among the cells 20 provided by each base station 10 communicating with a mobile station 50 in a soft handoff. More concretely, the main cell determination unit 33 identifies the best downlink communications quality among the downlink communications quality levels received from the base station signal receiver 31. Next, the main cell determination unit 33 determines the cell 20 provided by the base station 10 corresponding to the best downlink communications quality, as the main cell. The main cell determination unit 33 outputs the cell ID information corresponding to the best downlink communications quality (the cell ID information of the main cell) to the reference power ratio decision unit 34.

The base station information administrator 36 correlates a maximum downlink transmission power value with the cell ID information of each of the base stations 10, and administers them, similar to the first embodiment.

The reference power ratio decision unit 34 receives each of the downlink transmission power value from the base station signal receiver 31, and calculates a ratio of the downlink transmission power value to the maximum downlink transmission power value of the base station 10 providing the main cell. Then the reference power ratio decision unit 34 decides the calculated ratio to be a reference power ratio.

More concretely, same as in the first embodiment, the reference power ratio decision unit 34 extracts the cell ID information out of each downlink transmission power value from the base station signal receiver 31. Next, out of the extracted each cell ID information, the reference power ratio decision unit 34 identifies cell ID information matching the cell ID information from the main cell determination unit 33. The reference power ratio decision unit 34 identifies a downlink transmission power value that includes the identified cell ID information. Out of the maximum downlink transmission power values administered by the base station information administrator 36, the reference power ratio decision unit 34 identifies a maximum downlink transmission power value corresponding to the cell ID information from the main cell determination unit 33. The reference power ratio decision unit 34 calculates a ratio of the identified downlink transmission power value to the identified maximum downlink transmission power, and determines the calculated ratio as a reference power ratio. The determined power ratio is outputted to the base station signal transmitter 35.

The base station signal transmitter 35 transmits the reference power ratio from the reference power ratio decision unit 34 to each base station 10 communicating with the mobile station 50 in a soft handoff. Then, if there is a user signal to be sent to the mobile station 50 in the soft handoff, the base station signal transmitter 35 transmits the user signal to each base station 10 communicating with the mobile station 50.

With reference to FIG. 2 again, the base station 10 receives the reference power ratio and the user signal and performs the same processing as in the first embodiment. That is, the radio controller signal receiver 14 in the base station 10 communicating with the mobile station 50 in the soft handoff receives the reference power ratio from the radio controller 30, and sends it to the downlink power controller 15. The radio controller signal receiver 14 receives the user signal if any and sends it to the mobile station signal transmitter 16.

The same as in the first embodiment, the downlink power controller 15 calculates a reference value for a downlink transmission power value to be used by its own base station 10, based on the received reference power ratio and its own downlink maximum transmission power value. For example, if the reference power ratio is obtained by dividing the downlink transmission power value by the downlink maximum transmission power of the base station that provides the main cell, the downlink power controller 15 obtains a reference value for its downlink transmission power value by multiplying the reference power ratio by its own downlink maximum transmission power value. Then, the downlink power controller 15 controls its own downlink transmission power so that it approaches the reference value. In this manner, the downlink power controller 15 controls its own downlink transmission power value so that the ratio of its own downlink transmission power value to the downlink maximum transmission power value approaches the reference power ratio.

The mobile station signal transmitter 16 transmits the user signal and other signals to the communicating mobile station 50 in the soft handoff, by using the downlink transmission power value determined by the downlink power controller 15.

Figure 6:
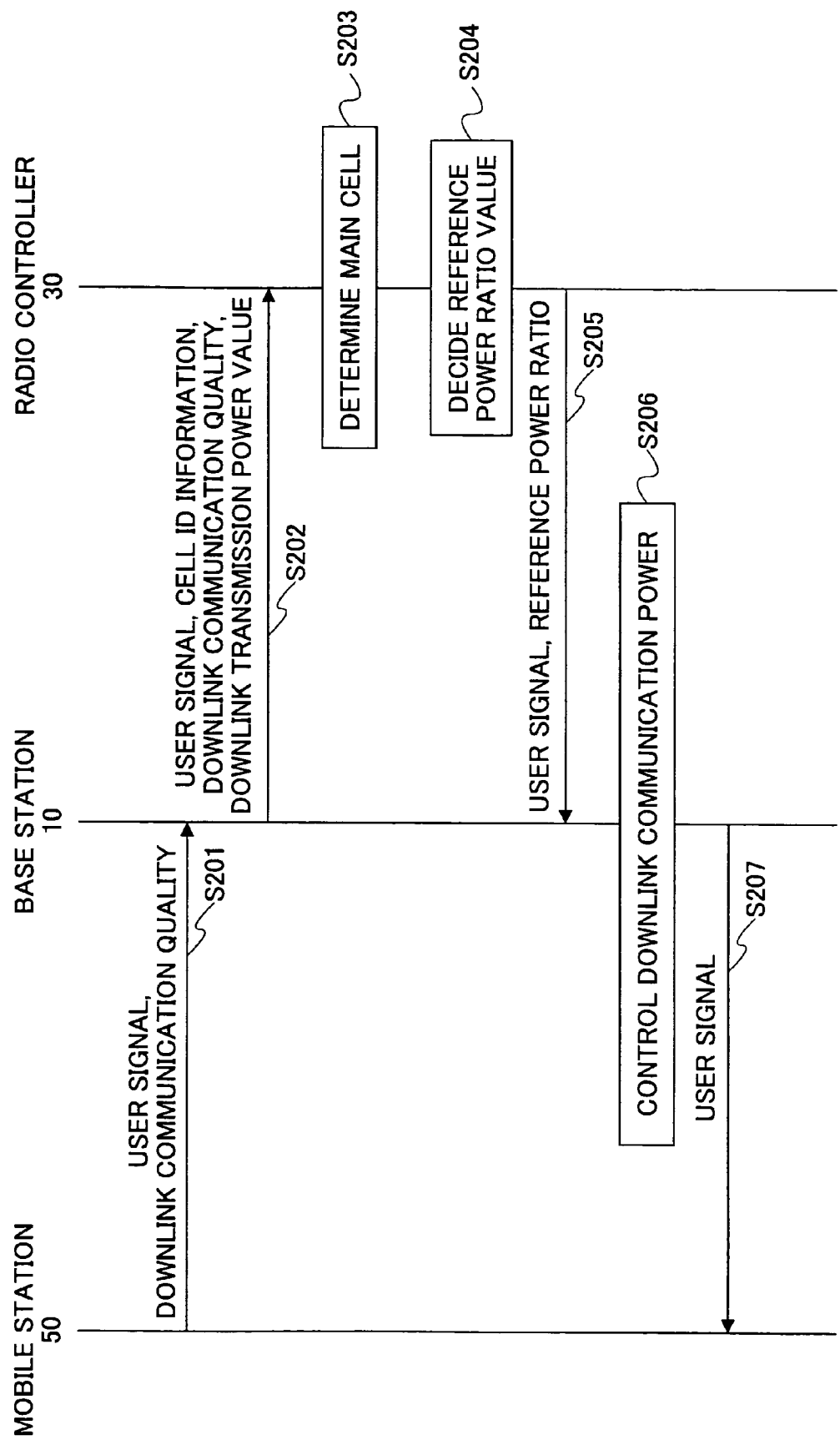
FIG. 6 is a sequence chart showing an operation of the mobile communication system according to the second embodiment.

Next, the operation of the mobile communication system 1 according to the second embodiment of the present invention is explained below. FIG. 6 illustrates the operational sequence of the mobile communication system 1 according to the second embodiment of the present invention. The base station 10 communicating with the mobile station 50 in a soft handoff receives a user signal and a downlink communications quality level from the mobile station 50 (Step 201). The base station 10 transmits the user signal, the downlink communications quality level, cell ID information for the cell provided by itself and its own downlink transmission power value at that time to the radio controller 30 (Step 202).

Based on the downlink communications qualities sent from each base station 10, out of the cells 20 provided by each base station 10 communicating with the mobile station 50 in the soft handoff, the radio controller 30 identifies a cell 20 having the best downlink communications quality, and determines the best cell 20 as the main cell (Step 203).

Next, the radio controller 30 calculates the ratio of the downlink transmission power value to the downlink maximum power value in the base station providing the main cell, and decides the calculated ratio to be the reference power ratio (Step 204). Then the radio controller 30 transmits the decided reference power ratio and user signals to each base station 10 communicating with the mobile station 50 in the soft handoff (Step 205).

Each of the base stations 10 communicating with mobile station 50 in the soft handoff controls its own downlink transmission power value so that the ratio of its own downlink transmission power value to its own downlink maximum transmission power value approaches the received reference power ratio (Step 206). The base station 10 transmits the user signal and other signals to the communicating mobile station 50 by the controlled downlink transmission power value (Step 207).

Figure 7:
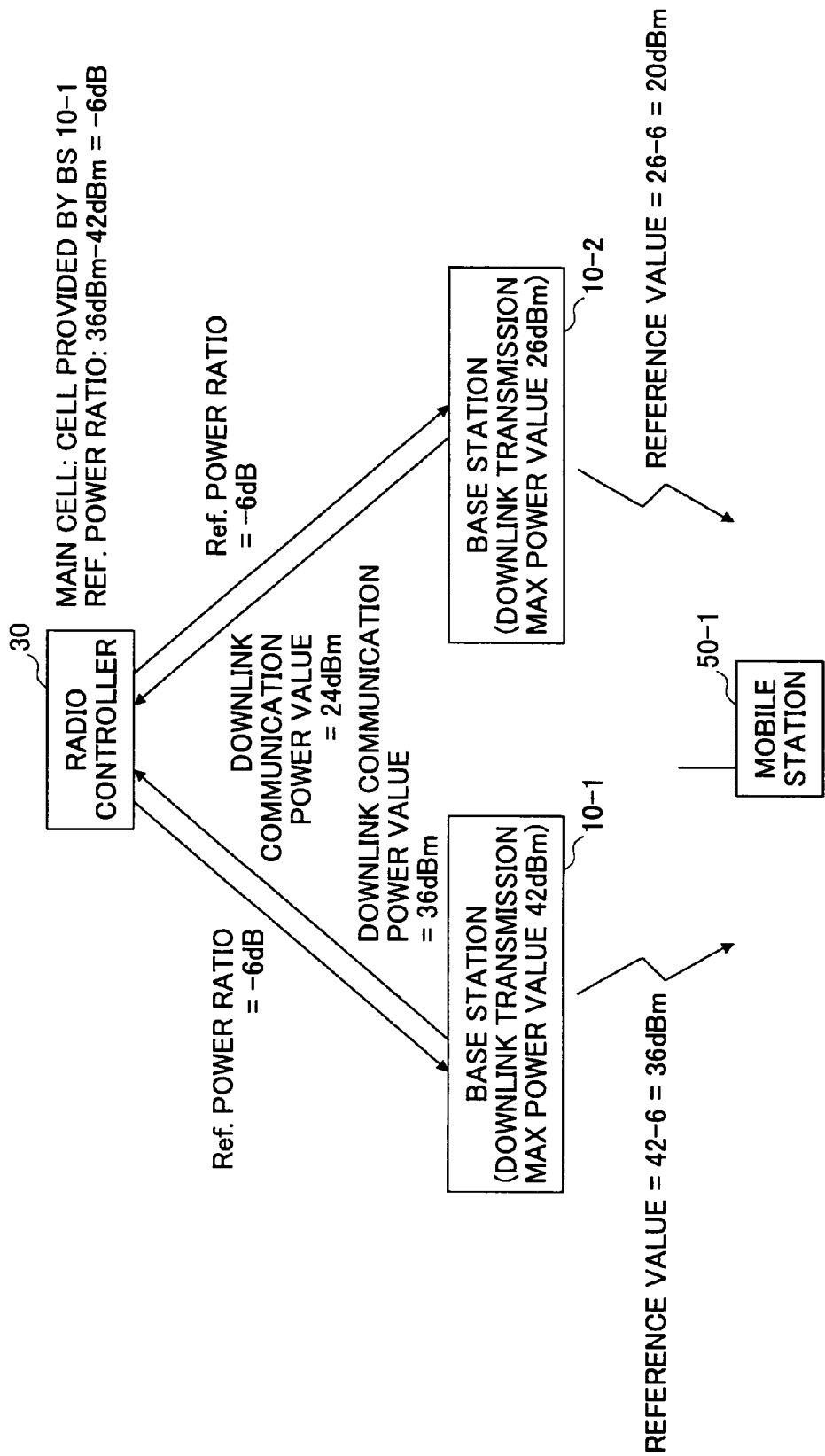
FIG. 7 schematically illustrates an example of transmission power control in accordance with the embodiments of the present invention.

FIG. 7 illustrates an example of transmission power control in the mobile communication system 1 according to embodiments of the present invention. In the shown example, each base station 10 has a different downlink maximum transmission power value. The base station 10-1 has a downlink maximum transmission power value of 42 dBm. The base station 10-2 has a downlink maximum transmission power value of 26 dBm.

The base station 10-1 transmits a downlink transmission power value (36 dBm) at that time to the radio controller 30. Similarly, the base station 10-2 transmits a downlink transmission power value (24 dBm) at that time to the radio controller 30.

Out of cells provided by the base stations 10-1 and 10-2, the radio controller 30 identifies a cell having the best uplink or downlink communications quality, and determines the best cell as the main cell. In a case where the cell provided by the base station 10-1 is determined as the main cell, the radio controller 30 calculates the ratio of the downlink transmission value (36 dBm) to the downlink maximum transmission value (42 dBm) of the base station 10-1, and decides the calculated power ratio (−6 dB=36 dBm 42 dBm) as the reference power ratio, and transmits it to the base stations 10-1 and 10-2.

Each of the base stations 10-1 and 10-2 controls its own downlink transmission power value so that the ratio of its own downlink transmission power value to its own downlink maximum transmission power value approaches the reference power ratio. In this case, the base station 10-1, based on its own downlink maximum transmission power value (42 dBm) and the received reference power ratio (−6 dBm), sets its own reference value for a downlink transmission power value as 36 dBm (=42 dBm−6 dBm). On the other hand, the base station 10-2, based on its own reference value for a downlink maximum transmission power value (26 dBm) and the received reference power ratio (−6 dBm), sets its own reference downlink transmission power value as 20 dBm (=26 dBm−6 dBm).

The base station 10-1 controls its own downlink transmission power value so that it approaches its own reference value (36 dBm). On the other hand, the base station 10-2 controls its own downlink transmission power value so that it approaches its own reference value (20 dBm). In this manner, each of the base stations 10-1 and 10-2 controls its own downlink transmission power value so that the ratio of its own downlink transmission power value to its own downlink maximum transmission power value approaches the reference power ratio.

As described above, in accordance with the embodiments, a cell having the best communications quality is selected for deciding the reference power ratio. The downlink transmission power value in the base station 10 providing the best cell 20, is generally small, due to less fading effect. Therefore, each base station 10 is prevented from unnecessarily increasing its downlink transmission power, which occurrs in the prior art. Thus it is possible in the embodiments to appropriately control downlink transmission power.

In accordance with the embodiments of the present invention, the power balance is controlled so that not the downlink transmission power itself but the ratio of the downlink transmission power to downlink maximum transmission power approaches the reference power ratio. Therefore, each base station 10 communicating with a mobile station in a soft handoff can be surely controlled irrespective of its downlink maximum transmission power.

In accordance with the second embodiment, a cell 20 having the best downlink communication quality is selected for deciding the reference power ratio. Therefore each base station can always be appropriately controlled even under such a situation that its uplink communications quality and downlink communications quality are much different from each other.

In the above embodiments, a cell having the best communications quality is employed for deciding the reference power ratio. However, another cell having not the best but good communications quality can also be employed.

In the above embodiments, the base station information administrator 36 in the radio controller 30 administers the downlink maximum transmission power values in the base stations 10. Instead, each of the base stations 10 can appropriately transmit its downlink maximum transmission power value to the radio controller 30. In this case, the radio controller signal transmitter 13 in the base station 10 adds its cell ID information to the downlink maximum transmission value, and transmits them to the radio controller 30. The base station signal receiver 31 in the radio controller 30 receives the downlink maximum transmission power values from each base station, and sends them to the reference power ratio decision unit 34. Out of the received downlink maximum transmission power values, the reference power ratio decision unit 34 identifies the downlink maximum transmission power value including the cell ID information from the main cell, and utilizes the identified downlink maximum transmission power value for deciding the reference power ratio.

According to the present invention, downlink transmission power in each base station 10 communicating with a mobile station in a soft handoff can be surely controlled irrespective of its downlink maximum transmission power.

It should be noted that the present invention is not limited to the embodiments specifically disclosed above, but other variations and modifications may be made without departing from the scope of the present invention.

The present application is based on Japanese Priority Application No. 2003-054230 filed on Feb. 28, 2003 with the Japanese Patent Office, the entire contents of which are hereby incorporated by reference.

What is claimed is:

1. A mobile communication system having a plurality of base stations and a radio controller configured to control each of the base stations, wherein,
   each of the base stations comprises a transmission power notifying unit which notifies the radio controller of downlink transmission power to mobile stations;
   the radio controller comprises:
      a cell determination unit which determines one of a plurality of cells having good communications quality among the cells provided by each of the base stations;
      a reference power ratio decision unit which decides a reference power ratio based on the ratio of the downlink transmission power of the base station providing the determined cell to maximum downlink transmission power of the base station;
      a reference power ratio notifying unit which notifies each of the base stations of the decided reference power ratio; and
   each of the base stations further comprises a transmission power controller which controls the downlink transmission power so that the ratio of the base station downlink transmission power to its maximum transmission power to mobile stations approaches the reference power ratio.

2. A radio controller for controlling a plurality of base stations in a radio communication system, comprising:
   a transmission power acquiring unit which acquires the downlink transmission powers from the base stations to mobile stations, which are provided by each of the base stations;
   a cell determination unit which determines one of a plurality of cells having good communications quality among the cells provided by each of the base stations;
   a reference power ratio decision unit which decides a reference power ratio based on the ratio of the downlink transmission power of the base station providing the determined cell to maximum downlink transmission power of the base station; and
   a reference power ratio notifying unit which notifies each of the base stations of the decided reference power ratio.

3. The radio controller as claimed in claim 2, wherein the communications quality is an uplink communications quality from the mobile stations to the base stations.

4. The radio controller as claimed in claim 3, further comprising an uplink communications quality measuring unit which measures the uplink communications qualities.

5. The radio controller as claimed in claim 2, wherein the communications quality is a downlink communications quality to the mobile stations.

6. The radio controller as claimed in claim 2, further comprising a maximum transmission power administrator which administrates the downlink maximum transmission power of each of the bases stations.

7. A base station establishing a radio communication system together with other base stations and a radio controller which controls each of the base stations, comprising:
   a transmission power notifying unit which notifies the radio controller of downlink transmission power to mobile stations;
   a reference power ratio acquiring unit which acquires a reference power ratio provided by the radio controller, the reference power ratio being decided based on the ratio of the downlink transmission power of a base station providing a determined cell to maximum downlink transmission power of the base station stations; and a transmission power controller which controls the downlink transmission power so that the ratio of the base station downlink transmission power to its maximum transmission power to mobile stations approaches the reference power ratio.

8. The bases station as claimed in claim 7, further comprising:
  a downlink communication quality acquiring unit which acquires downlink communications quality levels provided by the mobile stations; and
  a downlink communication quality notifying unit which notifies the radio controller of the downlink communication quality levels.

9. A transmission power controlling method in a mobile communication system having a plurality of base stations and a radio controller configured to control each of the base stations, comprising the steps of:

notifying, by each of the base stations, the radio controller of downlink transmission power to mobile stations;

determining, by the radio controller, one of a plurality of cells having good communications quality among the cells provided by each of the base stations;

deciding, by the radio controller, a reference power ratio decision unit which decides a reference power ratio based on the ratio of the downlink transmission power of the base station providing a cell determined in the determining step to maximum downlink transmission power of the base station;

notifying, by the radio controller, each of the base stations of the decided reference power ratio; and controlling, by each of the base stations, the downlink transmission power so that the ratio of the base station downlink transmission power to its maximum transmission power to mobile stations approaches the reference power ratio.

* * * * *